(12) United States Patent
Kung et al.

(10) Patent No.: US 10,090,565 B2
(45) Date of Patent: Oct. 2, 2018

(54) POLYMER FUNCTIONALIZED GRAPHENE OXIDE AND THERMALLY RESPONSIVE ION PERMEABLE MEMBRANES MADE THEREFROM

(71) Applicant: Northwestern University, Evanston, IL (US)

(72) Inventors: Harold H. Kung, Wilmette, IL (US); Jingmei Shen, Evanston, IL (US); Mayfair C. Kung, Wilmette, IL (US); Cary M. Hayner, Evanston, IL (US)

(73) Assignee: Northwestern University, Evanston, IL (US)

( * ) Notice: Subject to any disclaimer, the term of this patent is extended or adjusted under 35 U.S.C. 154(b) by 534 days.

(21) Appl. No.: 14/700,273

(22) Filed: Apr. 30, 2015

(65) Prior Publication Data

US 2015/0318531 A1 Nov. 5, 2015

Related U.S. Application Data

(60) Provisional application No. 61/987,719, filed on May 2, 2014.

(51) Int. Cl.
*H01M 2/16* (2006.01)
*H01M 10/42* (2006.01)
(Continued)

(52) U.S. Cl.
CPC ........ *H01M 10/4235* (2013.01); *B01D 69/02* (2013.01); *B01D 69/14* (2013.01); *B01D 71/021* (2013.01); *H01M 2/1653* (2013.01); *H01M 2/1673* (2013.01); *H01M 2/1686* (2013.01); *H01M 2/348* (2013.01); *H01M 4/133* (2013.01); *H01M 4/587* (2013.01); *B01D 2325/00* (2013.01); *H01M 4/382* (2013.01); *H01M 10/052* (2013.01); *H01M 2200/10* (2013.01)

(58) Field of Classification Search
CPC ............ H01M 2/1653; H01M 2/1673; H01M 2/1686; H01M 2/348; H01M 4/133; H01M 4/587; H01M 4/382; H01M 10/4235; H01M 10/052; H01M 2200/10; B01D 69/02; B01D 69/14; B01D 71/021
See application file for complete search history.

(56) References Cited

U.S. PATENT DOCUMENTS 6,171,723 B1 1/2001 Loch et al.
9,050,251 B2 * 6/2015 Boyden ................ A61K 9/0019
(Continued)

OTHER PUBLICATIONS

Yuchen et al, "Functional graphene oxide modified composite electrolyte and preparation method thereof", Univ. Northwestern Polytechnic, Jan. 16, 2013 (Abstract).*

(Continued)

*Primary Examiner* — Raymond Alejandro
(74) *Attorney, Agent, or Firm* — Bell & Manning, LLC

(57) ABSTRACT

Thermally responsive materials, porous membranes comprising the thermally responsive materials, and batteries incorporating the porous membranes as thermally responsive separation membranes are provided. Also provided are methods of making the thermally responsive materials. The thermally responsive materials comprise upper critical solution temperature (UCST) polymers covalently bound to a support substrate.

16 Claims, 11 Drawing Sheets

(51) Int. Cl.
    *H01M 4/133*     (2010.01)
    *H01M 4/587*     (2010.01)
    *H01M 2/34*     (2006.01)
    *B01D 69/02*     (2006.01)
    *B01D 69/14*     (2006.01)
    *B01D 71/02*     (2006.01)
    *H01M 4/38*     (2006.01)
    *H01M 10/052*     (2010.01)

(56) References Cited

U.S. PATENT DOCUMENTS

2014/0011093 A1     1/2014   Kim et al.
2014/0370246 A1*   12/2014   Hurt ...................... C01B 31/043
                                                428/189
2015/0311569 A1*   10/2015   Yu ........................ H01M 4/131
                                                429/300

OTHER PUBLICATIONS

Shen et al., Upper-critical solution temperature (UCST) polymer functionalized graphene oxide as thermally responsive ion permeable membrane for energy storage devices, Journal of Materials Chemistry A, 2, Issue 43, Sep. 25, 2014, pp. 18204-18207.

Sun et al., A one-step strategy for thermal- and pH-responsive graphene oxide interpenetrating polymer hydrogel networks, Journal of Materials Chemistry, 21, Feb. 22, 2011, pp. 4095-4097.

Alzari et al., Graphene-containing thermoresponsive nanocomposite hydrogels of poly(N-isopropylacrylamide) prepared by frontal polymerization, Journal of Materials Chemistry, 21, May 10, 2011, pp. 8727-8733.

International Search Report & Written Opinion issued in PCT/US2015/028410, dated Jul. 17, 2015.

Nedelcheva et al., Electrostatic self-assembly of thermally responsive zwitterionic poly(N-isopropylacrylamide) and poly(ethylene oxide) modified with ionic groups, Polymer 46, Jan. 25, 2005, pp. 2059-2067.

Mah et al., Thermo-Responsive Hydrogels for Stimuli-Responsive Membranes, Processes, 1, Sep. 30, 2013, pp. 238-262.

Jeon et al., Phase behavior of polymer/diluent/diluent mixtures and their application to control microporous membrane structure, Journal of Membrane Science 300, May 24, 2007, pp. 172-181.

Doncom, Kay E.B., et al., The direct synthesis of sulfobetaine-containing amphiphilic block copolymers and their self-assembly behavior, European Polymer Journal 87, Sep. 4, 2016, pp. 497-507.

Sin, Mei-Chan, et al., Hemocompatibility of zwitterionic interfaces and membranes, Polymer Journal 46, Jun. 18, 2014, pp. 436-443.

* cited by examiner

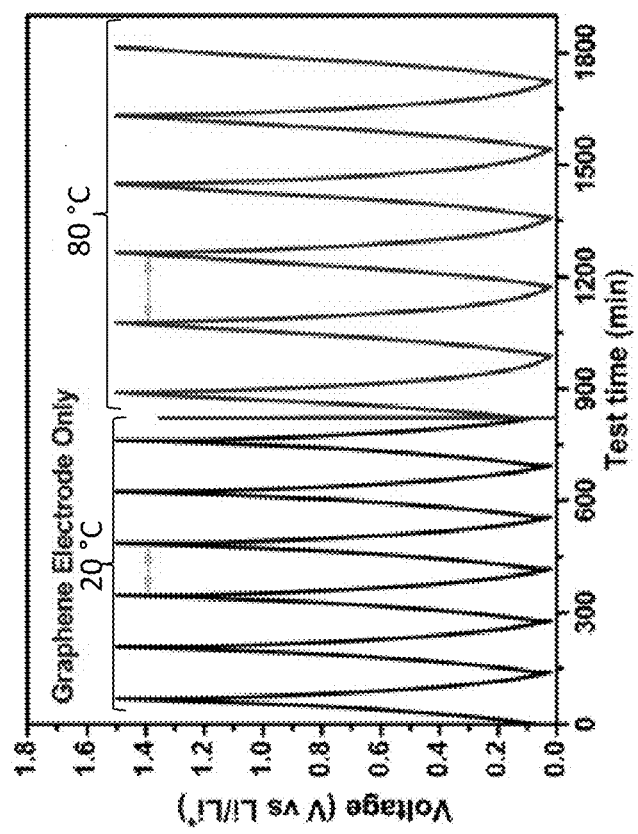
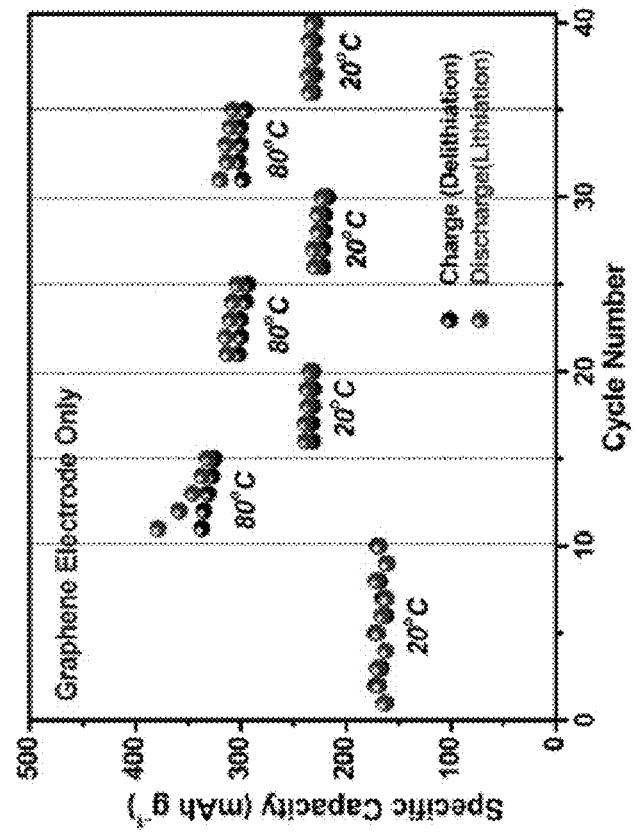
FIG. 2A
FIG. 2B

US 10,090,565 B2

POLYMER FUNCTIONALIZED GRAPHENE OXIDE AND THERMALLY RESPONSIVE ION PERMEABLE MEMBRANES MADE THEREFROM

CROSS-REFERENCE TO RELATED APPLICATIONS

The present application claims priority to U.S. Provisional Patent Application No. 61/987,719 that was filed May 2, 2014, the entire contents of which are hereby incorporated by reference.

REFERENCE TO GOVERNMENT RIGHTS

This invention was made with government support under DE-AC02-06CH11357 awarded by the Department of Energy. The government has certain rights in the invention.

BACKGROUND

Stimuli-responsive and environmental-sensitive polymers and hydrogels [1-3] have been a subject of great interest due to their potential applications in, e.g. separation,[4] sensing [5, 6], catalysis [7], drug delivery [8, 9], and biomaterials [10]. When incorporated into a membrane, they can provide gating functions to the transport of ions and molecules by reversibly changing the permeability and selectivity of the membrane, as well as altering the adsorptive or hydrophilic/hydrophobic properties. The properties of these materials change in response to environmental changes or stimuli that can be mechanical, chemical, pH, temperature, redox potential, or light.

Recently, there has been increasing interest to apply stimuli-responsive polymers to energy storage systems, particularly in mitigating the undesirable and potentially dangerous effect of thermal runaway. For example, Roberts and coworkers investigated an electrolyte composed of thermally responsive copolymer of acrylic acid and poly(N-isopropylacrylamide) (pNIPAM). At low temperatures, pNIPAM is soluble, but phase segregates above the lower-critical solution temperature (LCST) and removes the ions from solution, thus causing a sharp decrease in the ionic conductivity of the electrolyte. In another example, Wei and coworkers used a coating of thermosensitive polymer P(N-isopropylacrylamide-co-2-acrylamido-2-methyl propane sulfonic acid) (P(NIPAM-co-SPMA)) to block access of ions to the pseudocapacitor material NiAl double layered hydroxide above the LCST.[11] The polymers in these two examples function in an aqueous system. Thus, they are limited to relatively low voltages.

Such aqueous systems are not suitable for Li ion batteries or super- and pseudocapacitors using ionic liquid or organic electrolytes, which are necessary for higher voltage applications. Thus far, no reversible thermal response systems have been reported for these non-aqueous applications. Currently for these systems, other means are employed to mitigate catastrophic thermal incidence. For example, measures used for Li ion batteries include introducing fire retardants or autonomous shut-down additives into the electrolyte,[12] applying positive temperature coefficient coatings on the electrode,[13, 14] or using shut-down separators. [15] However, once deployed, these processes are irreversible and the energy storage device is no longer functional.

SUMMARY

Thermally responsive materials and batteries incorporated the thermally responsive materials as separation membranes are provided.

One embodiment of a thermally responsive material comprises: a substrate; and polymer molecules covalently bonded to the substrate. The polymer molecules have an upper-critical solution temperature in non-aqueous solution and are characterized in that they phase separate from the non-aqueous solution at temperatures below the upper-critical solution temperature, but undergo a reversible conformational change at the upper-critical solution temperature such that they are miscible in the non-aqueous solution at temperatures above the upper-critical solution temperature.

One embodiment of a battery comprises: a first electrode; a second electrode; a porous, electrically insulating, thermally responsive membrane between the first electrode and the second electrode; and a non-aqueous electrolyte in pores of the porous membrane. The porous, electrically insulating, thermally responsive membrane comprises: a substrate and polymer molecules covalently bonded to the substrate. The polymer molecules have an upper-critical solution temperature in non-aqueous solution, such that they phase separate from the non-aqueous solution at temperatures below the upper-critical solution temperature, but undergo a reversible conformational change at the upper-critical solution temperature such that they are miscible in the non-aqueous solution at temperatures above the upper-critical solution temperature. As a result, the ionic permeability of the porous, electrically insulating, thermally responsive membrane decreases at temperatures above the upper-critical solution temperature.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

Figures 2C, 2D:
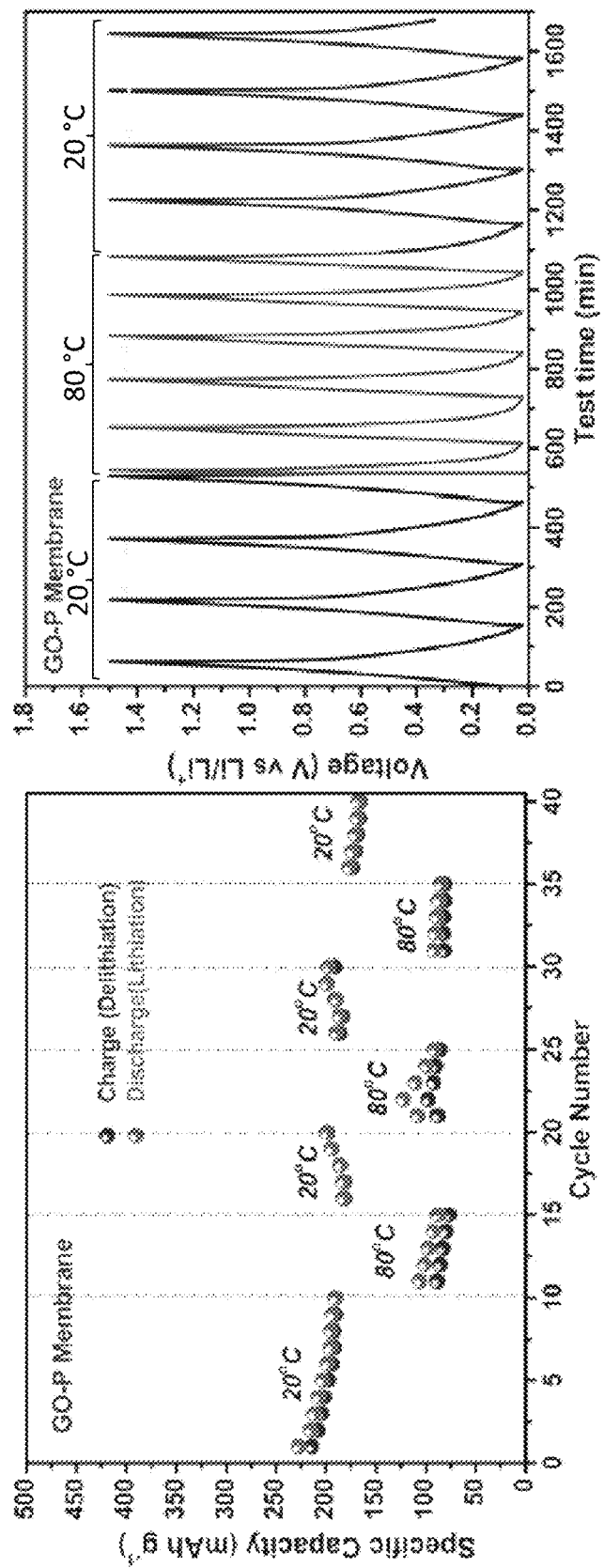
FIG. 2C. Specific charge capacity (mAh $g^{-1}$ graphene electrode) of Li metal-graphene paper cells, evaluated at 20 or 80° C.: separator consisted of a layer of GO-PMABS sandwiched between two sheets of glass fiber.
FIG. 2D. Voltage versus time for the specific charge capacity measurements of FIG. 2C.
Figure 2F:
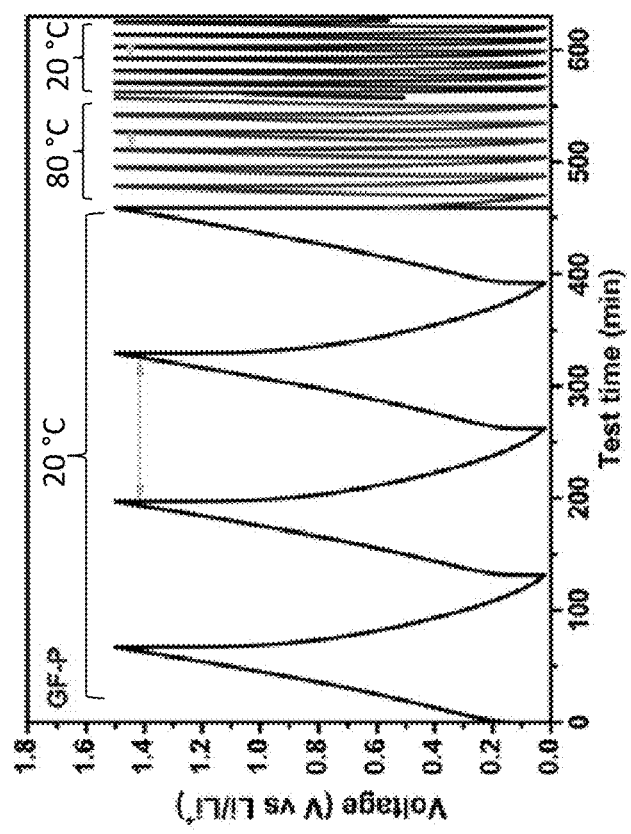
FIG. 2A. Specific charge capacity (mAh $g^{-1}$ graphene electrode) of Li metal-graphene paper cells, evaluated at 20 or 80° C.: separator membrane consisted of only a sheet of glass fiber.
FIG. 2B. Voltage versus time for the specific charge capacity measurements of FIG. 2A.
FIG. 2E. Specific charge capacity (mAh $g^{-1}$ graphene electrode) of Li metal-graphene paper cells, evaluated at 20 or 80° C.: separator consisted of a PMABS-impregnated glass fiber sandwiched between two sheets of glass fiber.

FIG. 2F. Voltage versus time for the specific charge capacity measurements of FIG. 2E.

Figure 3:
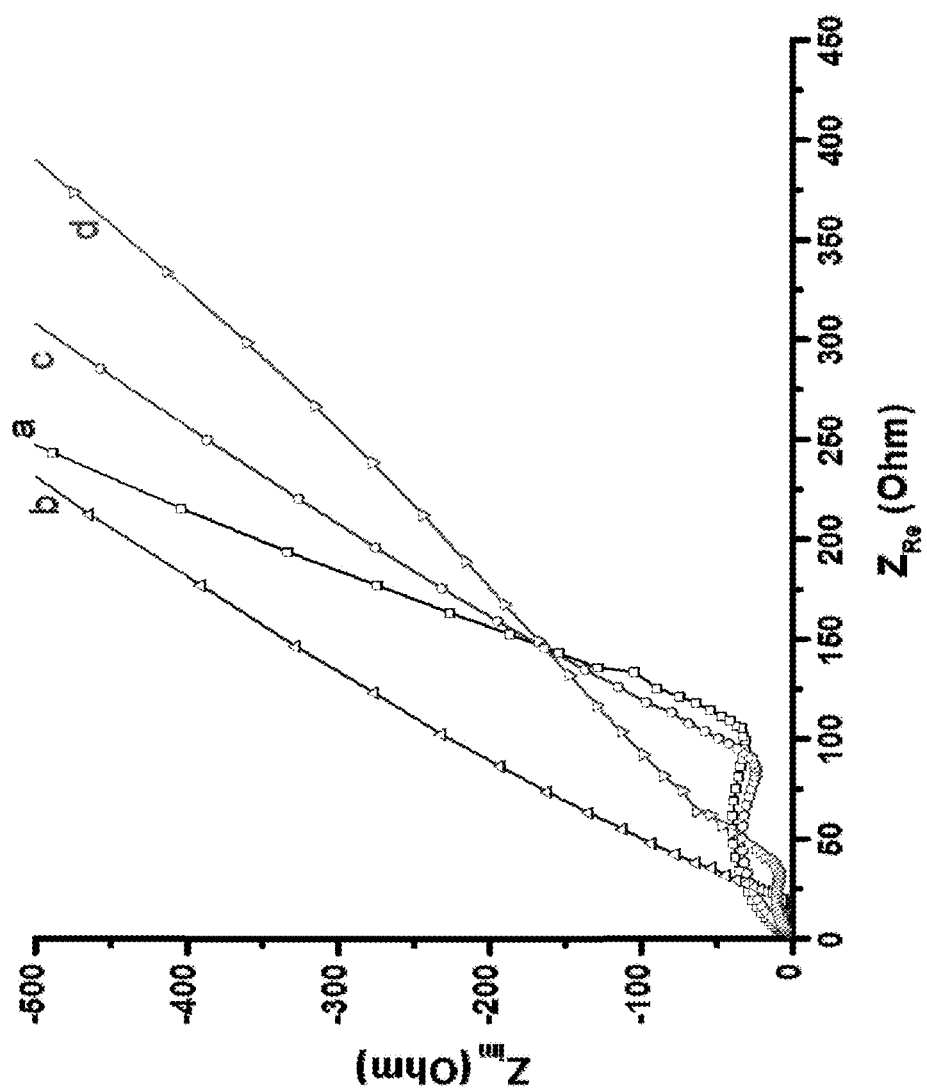

FIG. 3. Nyquist plots of reduced graphene oxide paper anode, data collected without (curve a at 25° and curve c at 60° C.) and with GO-PMABS in the separator (curve b at 20° and curve d at 60° C.).

Figure 4:
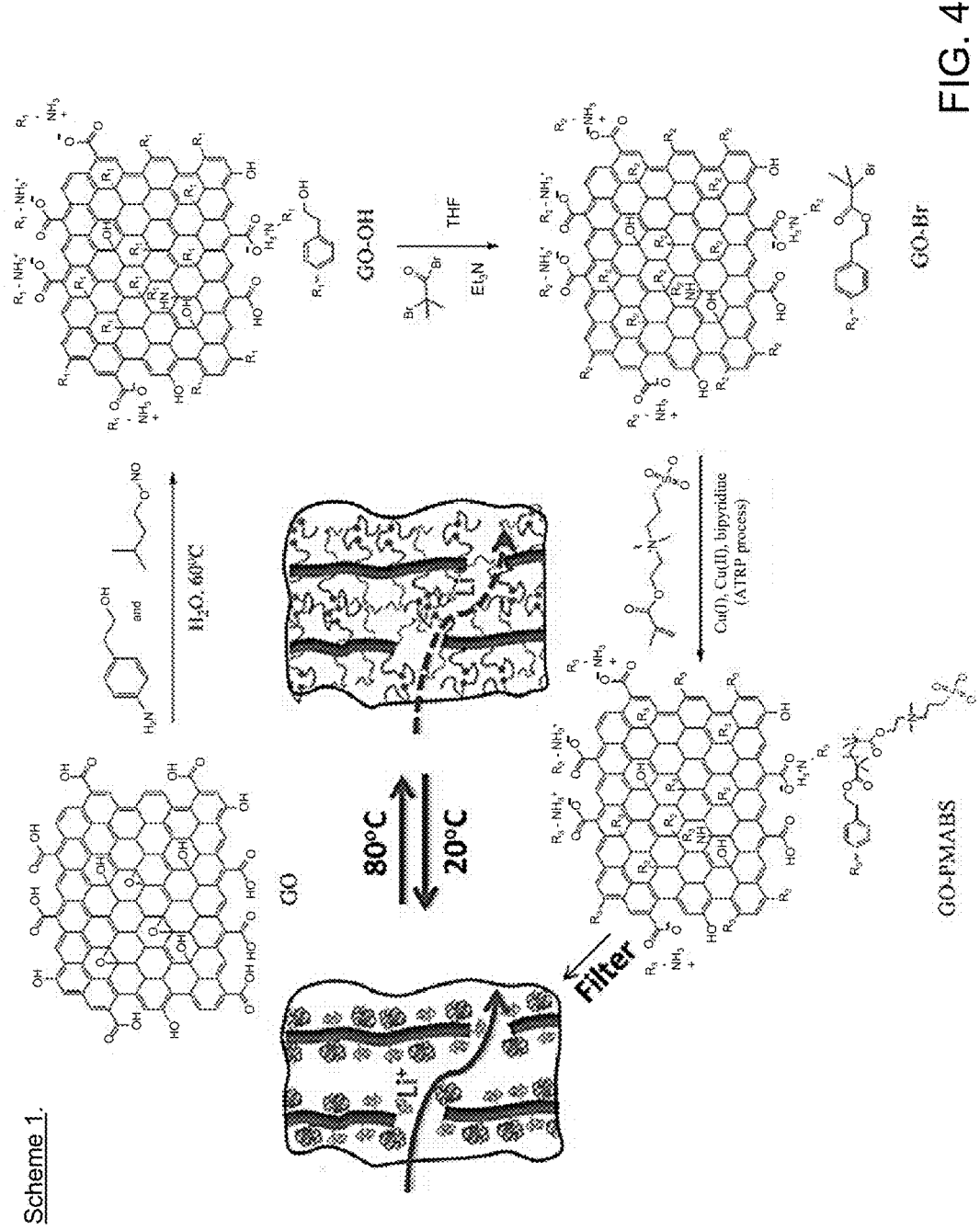

FIG. 4. Scheme 1. Synthesis of graphene oxide functionalized with poly(3-(N-2-methacryloyloxyethyl-N,N-dimethyl)ammonatobutane-sulfonate, GO-PMABS.

Figure 5:
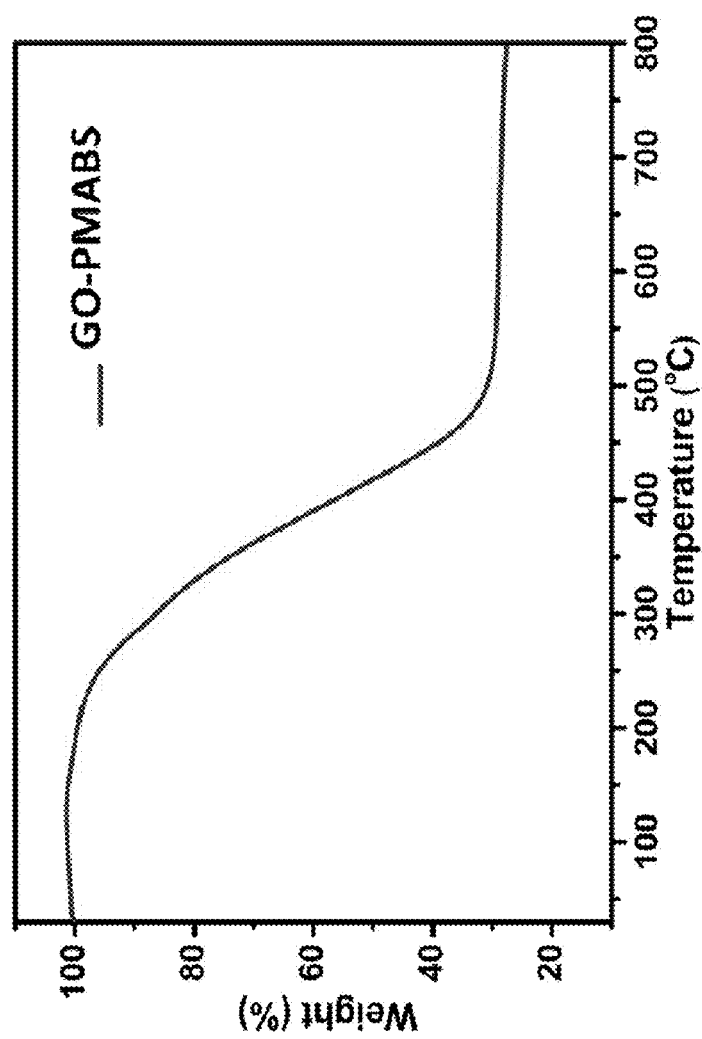

FIG. 5. Thermal Gravimetric Analysis (TGA) curve of GO-PMABS collected in $N_2$.

Figure 6:
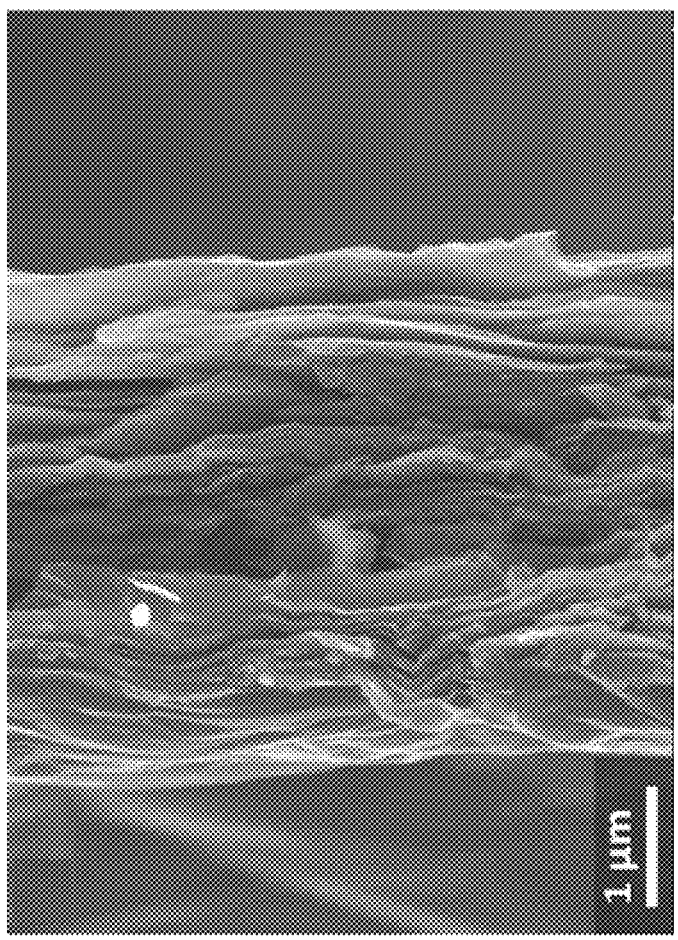

FIG. 6. Cross-sectional SEM image of a thermally reduced graphene paper anode (about 5.2 μm thick). All the electrochemical analysis in the example used the graphene paper anode with the same thickness.

Figure 7:
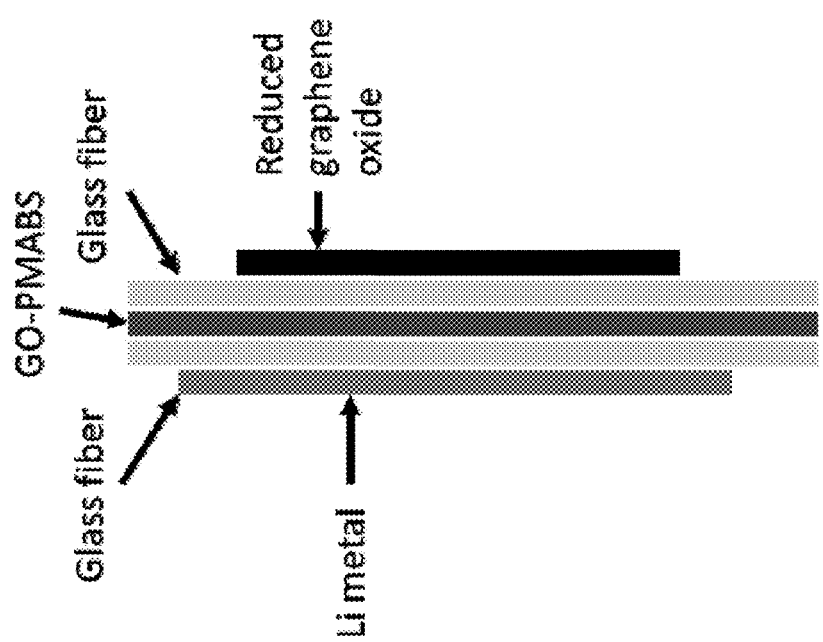

FIG. 7. Schematic diagram of an electrode assembly used for electrochemical measurements.

DETAILED DESCRIPTION

Thermally responsive materials, porous membranes comprising the thermally responsive materials, and batteries incorporating the porous membranes as thermally responsive separation membranes are provided. Also provided are methods of making the thermally responsive materials. The thermally responsive materials comprise upper critical solution temperature (UCST) polymers covalently bound to a support substrate. The UCST polymers undergo a reversible conformational change above their UCST, which results in a reduction in the ionic permeability of the thermally responsive materials and membranes comprising the materials.

Because the thermally-induced conformational change is reversible, the thermally responsive materials and membranes have applications in energy storage, ion sensors, purification technologies, electrochemistry and other applications which rely upon the control of ion mobility. For example, in energy storage applications the thermally responsive membranes can be used to mitigate thermal runaway by suppressing ion mobility at elevated temperature, thereby reducing the charge/discharge rates and heat generation. In other applications, they can be used to provide the function of internal cell-balancing by restricting local ion flow, which—when it is too fast—generates excessive heat.

The UCST polymers are a group of polymers that phase separate from solution at temperatures below the USCT, but become miscible in the solution at temperatures above the UCST. This transformation results in a change in the conformation of the polymer chains, which go from a more collapsed, globular state at temperatures below the UCST to a more open, uncoiled state at temperatures above the UCST. This change in miscibility in the solution may occur gradually over a temperature range centered around UCST. Examples of UCST polymers that can be used to form the materials are polybetaines, such as poly(sulfobetaine). Poly (3-(N-2-methacryloyloxyethyl-N,N-dimethyl)ammonatobutane-sulfonate (PMABS) is one, non-limiting example of a poly(sulfobetaine). PMABS having a molecular weight (Mn) in the range from about 100,000 to about 400,000 (e.g. from about 150,000 to 250,000) g/mol may be used. However, PMABS having molecular weights outside this range can also be used.

The UCST polymers are covalently attached to a substrate. The covalent attachments may be at one or more locations along the polymer chain, provided that it does not substantially interfere with the ability of the polymers to undergo the change in conformation. In some embodiments, the UCST polymers are covalently bound to the substrate at only one end.

A variety of substrates can be used and the substrate surfaces can be functionalized in order to allow for covalent bonding to the UCST polymers. The substrate may be a single piece of porous material. However, in some embodiments, the substrate comprises a plurality of material pieces, such as particles or flakes. The material from which the substrate is made will depend, at least in part, on the intended application of the thermally responsive materials. By way of illustration, if the thermally responsive material is for use in a separation membrane, as described in greater detail below, the substrate should be porous, electrically insulating and chemically and electrochemically stable towards the electrolyte and electrode materials.

Graphene oxide is one example of a suitable substrate material. The graphene oxide can be in the form of, for example, single-layer graphene oxide sheets or stacks of multiple graphene oxide sheets. The use of graphene oxide can be advantageous because it is electrically insulating, readily forms a self-supporting paper-like material, and possesses oxygenate groups that can be used to graft polymers, such as poly(sulfobetaine). These properties minimize the need for additional functionalization for grafting or handling for electrochemical testing. Various methods for making graphene oxide are known. A description of one method can be found in Zhao, X.; Hayner, C. M.; Kung, M. C.; Kung, H. H., *ACS Nano* 2011, 5, (11), 8739-8749. Other carbon-based materials could also be used.

Thin membranes comprising the thermally responsive materials can be used as porous separation membranes for liquid electrolyte batteries, such as Li-ion batteries, Li-sulfur batteries and Li-air batteries. The separation membrane is placed between the positive and negative electrodes to prevent physical contact of the electrodes while enabling free ionic transport and preventing electronic flow. A basic embodiment of a battery comprising a thermally responsive separation membrane comprises: a first electrode; a second electrode; a liquid electrolyte disposed between the first electrode and the second electrode; and a porous membrane in the liquid electrolyte separating the two electrodes (the cathode and the anode). The membrane, which is porous and filled with the liquid electrolyte, comprises the thermally responsive material comprising: a substrate and polymer molecules that are covalently bonded to the substrate, the polymer molecules having an upper-critical solution temperature. In some embodiments, the battery is a lithium ion battery comprising a Li metal electrode and a non-aqueous liquid electrolyte comprising a lithium salt and one or more organic solvents. In some embodiments, the batteries have a graphene electrode, examples of which are described in U.S. patent application publication number 2011/0111303 and in U.S. Pat. No. 8,551,650. Examples of other electrode materials include, but are not limited to, silicon-graphene, silicon-carbon nanotubes, silicon-porous carbon, and single or multicomponent metal oxides. The use of such materials as electrodes is advantageous because they provide for a high Li storage capacity.

During normal battery operation, the UCST polymers in the thermally responsive material are phase-segregated and form hydrophobic aggregates attached to the substrate. In this configuration, ion flux is readily permitted through open channels in the membrane. However, at higher temperatures—such as those that might occur during battery overheating—the polymer molecules become miscible with the electrolyte solvent, although the polymer chains remain covalently anchored to the substrate. In this configuration, the ion flux through the channels in the membrane is reduced. As a result, ionic conduction through the separation membrane can be shut down at a temperature below that at which thermal runaway occurs.

Example

This example illustrates an embodiment of a thermal-responsive membrane that exhibits reversible changes in ion permeability in a non-aqueous electrolyte. The main component is a poly(sulfobetaine) polymer that was covalently grafted onto a membrane and had an upper-critical solution temperature (UCST).[16-18] Graphene oxide sheets provided the structural component of the membrane. Without intending to be bound to any theory of the technology, it is proposed that, at low temperatures, the attractive dipolar interaction between zwitterions in the polymer causes the polymer to phase segregate and form hydrophobic aggregates attached to the membrane, thus permitting ion flux through open channels in the membrane. Above the UCST when there is sufficient thermal energy to disrupt the attractive interaction, the polymer chains become independent and miscible with the electrolyte solvent, although one end of the polymer chain remains covalently anchored to the membrane. The potential consequences of this event include change in the viscosity of the electrolyte inside the membrane due to polymer dissolution, and solvation of the zwitterions and their interaction with the electrolyte ions. These result in hindering of the ion flux and lowering of the ionic permeability of the membrane.

EXPERIMENTAL SECTION

An abbreviated description of the experimental methods used in this example is provided here. Additional information is provided in the Supplementary Information (SI) that follows this example.

Materials and Methods

Graphene Oxide (GO)

GO was synthesized from flake graphite (Asbury Carbons, 230U Grade, High Carbon Natural Graphite 99+) using a modified Hummers method that we employed previously.[19] The graphite was treated with a concentrated $H_2SO_4$ solution containing $K_2S_2O_8$ and $P_2O_5$ at 80° C. for 4.5 h. Afterwards, the mixture was cooled and filtered, and the solid was washed until the filtrate became neutral in pH. After drying overnight, the shiny, dark-gray solid was dispersed into chilled $H_2SO_4$ in an ice bath, and $KMnO_4$ was added slowly with stirring while maintaining the temperature below 20° C. The resulting thick, dark green paste was allowed to react at 35° C. for 2 h followed by slow addition of distilled deionized (DDI) water to form a dark brown solution, while keeping the temperature below 50° C. throughout. After additional stirring for 2 h, the dark brownish solution was further diluted with distilled water, and $H_2O_2$ (30%) was added slowly, turning the color of the mixture bright yellow. The mixture was allowed to settle overnight, after which the supernatant was decanted, and the remaining product was repeatedly centrifuged and washed with DDI water until the pH of the solution became neutral.

4-Hydroxyethylphenyl Functionalized Graphene Oxide (GO-OH)

4-Aminophenethyl alcohol (6.3 g, 50 mmol) and isopentyl nitrite (75 mL, 0.5 mol) were added to a GO suspension (0.5 g, 5 mmol in 250 mL water), and the mixture was refluxed under nitrogen at 60° C. for 3 h. Then the mixture was filtered, washed with acetone, DMF, water, and acetone repeatedly until no impurities could be detected in the wash liquid. Finally, the mixture was washed with diethyl ether and dried overnight in a vacuum oven at 60° C.

2-Bromo-2-methylpropanoate-4-methylphenethyl Functionalized Graphene Oxide (GO-Br)

GO-OH (220 mg, 2.2 mmol) was dispersed in a mixture of dry THF (50 mL) and DMF (150 mL) by sonication for 1 hour. While chilled in an ice bath, triethylamine (61.31 mL, 440 mmol) was added to the suspension, followed by dropwise addition of α-bromoisobutyryl bromide (5.5 mL, 44 mmol). The mixture was stirred for 48 h at room temperature, then filtered, washed with acetone, THF, DMF, and DDI water repeatedly until the impurities were completely removed. Finally, the product was washed with a diethyl ether and dried overnight in a vacuum oven at 60° C.

Elemental analysis: 64.48%; C, 3.63%; H, 2.70%; N, and 12.97%; O, and 16.22%; Br by difference.

GO-PMABS

GO-Br (0.10 g) and 3-(N-2-methacryloyloxyethyl-N,N-dimethyl)ammonatobutanesulfonate (MABS) (15 g, 53.5 mmol) were first mixed with 40 mL DDI water and 160 mL MeOH at room temperature. The mixture was deoxygenated by bubbling dry argon through while stirring for 30 min. While under Ar, the catalyst system consisting of 2,2'-dipyridyl (420 mg, 2.7 mmol), CuCl (106 mg, 1.08 mmol), and $CuCl_2$ (15 mg, 0.10 mmol) was added, to initiate polymerization. The mixture continued to be stirred under Ar for another 30 min. After 72 h, polymerization was terminated by exposing the mixture to air. The product was filtered, washed with hot water several times to remove polymer that was not covalently bound, and dried at 60° C. for 24 h. The final product was labelled GO-PMABS. Its polymer content estimated from TGA was around 70 wt. %.

The molecular weight (Mn) and molecular weight distribution (Mw/Mn) of the grafted PMABS were estimated from free polymers formed with a sacrificial initiator, ethyl 2-bromoisobutyrate (EBiB), under the same reaction condition. The free polymers were characterized using multi-angle light scattering coupled to size-exclusion chromatography (Sec-Mals), with polystyrene as the standard. Two polymerization times, 36 and 72 h, were used for comparison. The molecular weight of the 72 h sample was 230,000 g/mol, higher than the 36 h sample which was 153,000 g/mol. Both samples showed relatively broad molecular weight distributions (Mw/Mn=1.62 and 1.48 for 36 and 72 h samples, respectively). Unless specified, PMABS refers to a sample prepared with 72 h polymerization.

GFib (PMABS)

A polymer-glass fiber composite in which the polymer was deposited by drying was prepared by casting an aqueous solution containing 10 wt. % PMABS (72 h polymerization) onto a glass fiber membrane at about 40° C., following by drying under vacuum at 100° C. for 24 h.

Characterization

Electrochemical tests were conducted using a cell consisted of a Li metal foil as one electrode and a reduced graphene oxide paper as another. The separator was either a glass fiber, or a layer of GO-PMABS or GFib (PMABS) sandwiched between two layers of glass fiber. The reduced graphene oxide paper electrode was prepared by reducing a graphene oxide paper at 850° C. in an inert atmosphere. A mixture of dimethyl carbonate and ethyl carbonate (7:3 v/v)

containing 1.2 M $LiPF_6$ was used as the electrolyte. For measurements at elevated temperatures, the coin cell was submerged in a silicon oil bath.

Quartz crystal microbalance measurements were conducted by submerging the sample holder in the electrolyte under a nitrogen atmosphere at 25 and 50° C., and allowing the sample to stabilize for about 1 h. The frequency shifts of an uncoated crystal and one coated with a thin layer of PMABS were measured.

Results and Discussion

Preparation of GO-PMABS

The thermal response membrane was prepared by grafting a zwitterion-containing polymer onto a graphene oxide with the surface-initiated atom transfer radical polymerization (SI-ATRP) process as shown in FIG. 4, Scheme 1.[20-22] In this procedure, an initiator was first anchored onto the GO surface. This involved first populating the GO with primary alcohol groups to form GO-OH, which was achieved by aminolysis of surface epoxide with 4-aminophenethyl alcohol in the presence of isopentyl nitrite and by reaction with carboxylic acid groups to form diazonium salts. Esterification of GO-OH by reaction with bromoisobutyryl bromide to form GO-Br introduced the ATRP initiators. With this approach, a high loading of ATRP initiators could be introduced onto the surface. SI-ATRP of MABS was accomplished with a $CuCl/CuCl_2$/bpy catalyst system, using a procedure modified from the literature (see SI for details). [23] The resulting suspension could be filtered, washed to remove soluble components, and dried to form a composite membrane GO-PMABS. One advantage of this method was that no soluble polymer was formed, since the free radicals required for chain growth remained covalently anchored to the surface.

Figure 1A:
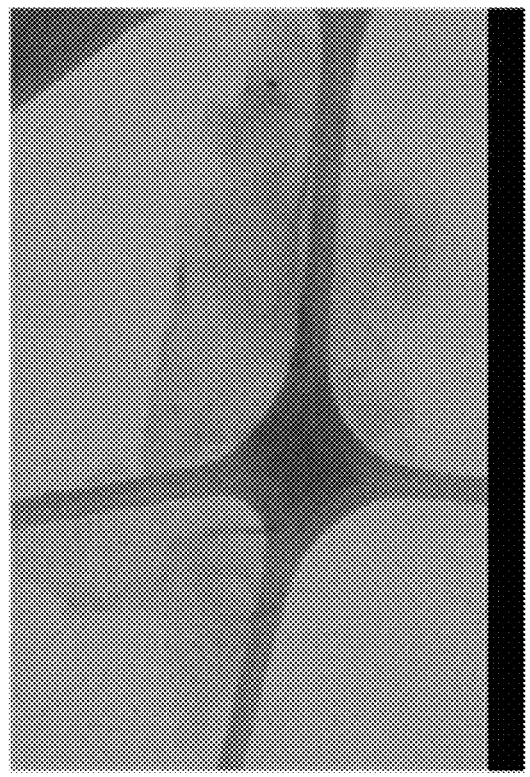
FIG. 1A. Scanning Electron Microscope (SEM) image (inset digital image) of graphene oxide/poly(3-(N-2-methacryloyloxyethyl-N,N-dimethyl)ammonatobutane-sulfonate (GO-PMABS).
Figure 1B:
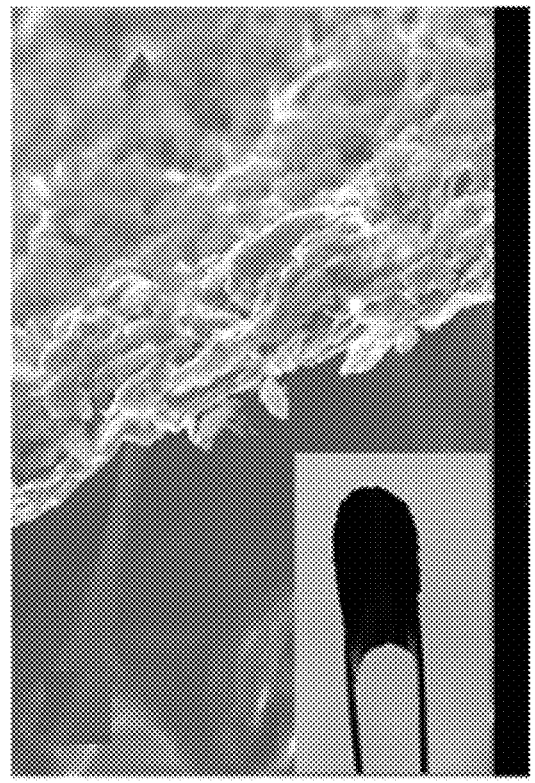
FIG. 1B. Transmission Electron Microscope (TEM) image of GO-PMABS.

A GO-PMABS membrane was flexible but self-supporting (FIG. 1A inset). Its SEM images indicated a rather corrugated surface (FIG. 1A) that was in contrast to a smoother surface of GO (FIG. 6), whereas its TEM image showed that it was made with thin sheets (FIG. 1B). The roughened surface was consistent with the presence of polymer aggregates. The TGA result of GO-PMABS under a flow of $N_2$ showed 70% mass loss in the range of 300-500° C., when a dried GO would not show mass losses (FIG. 5). Thus, the weight loss was due to pyrolysis of the polymer, which was estimated to be somewhat higher than 70 wt. %. The fact that no weight was lost below 100° C. was consistent with the expected hydrophobic nature of GO-PMABS at room temperature.

Figures 1C, 1D:
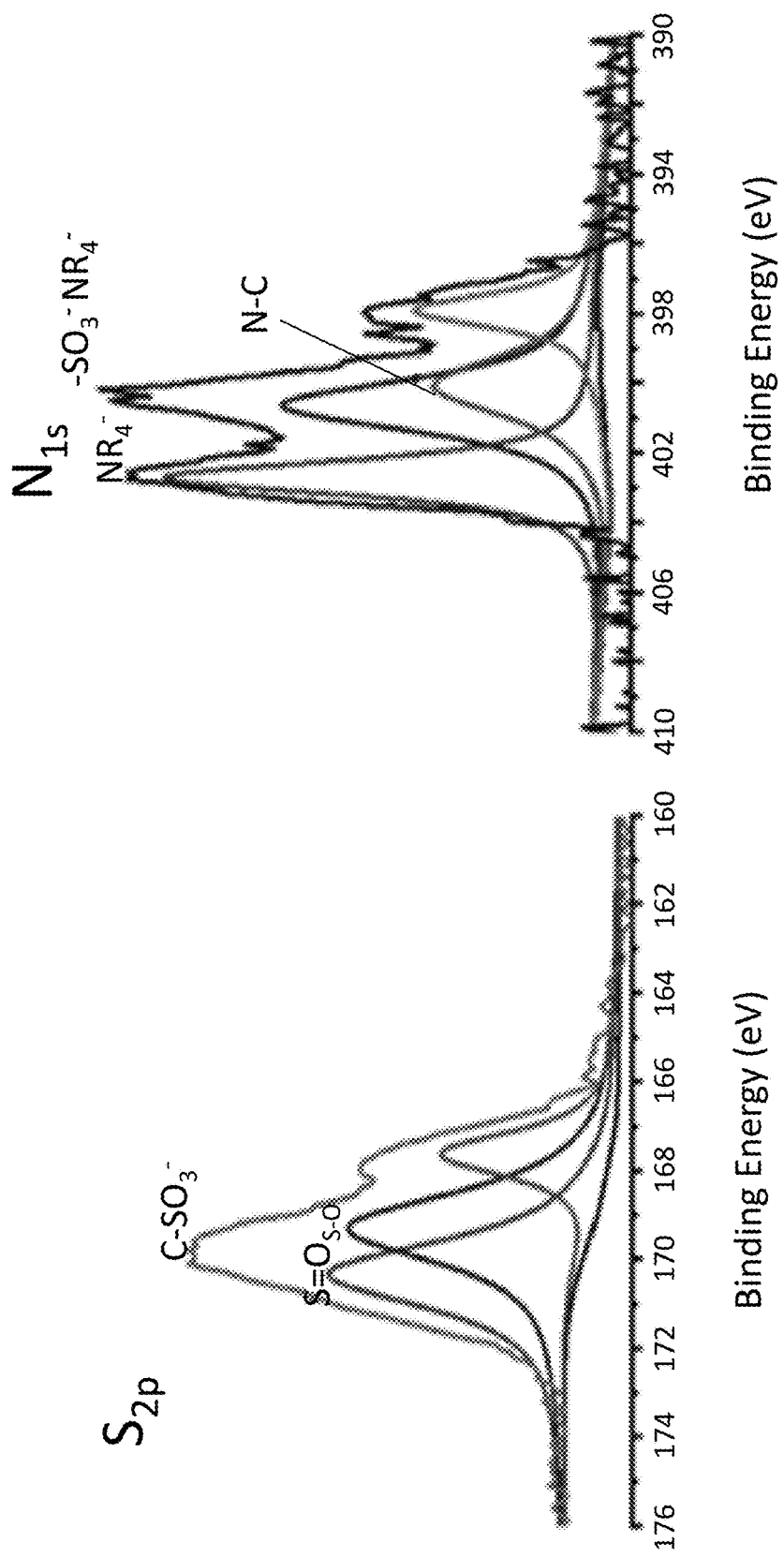
FIG. 1C. X-ray Photoelectron Spectrum (XPS) $S_{2p}$ peak of GO-PMABS.
FIG. 1D. XPS $N_{1s}$ peak of GO-PMABS.
Figure 1E:
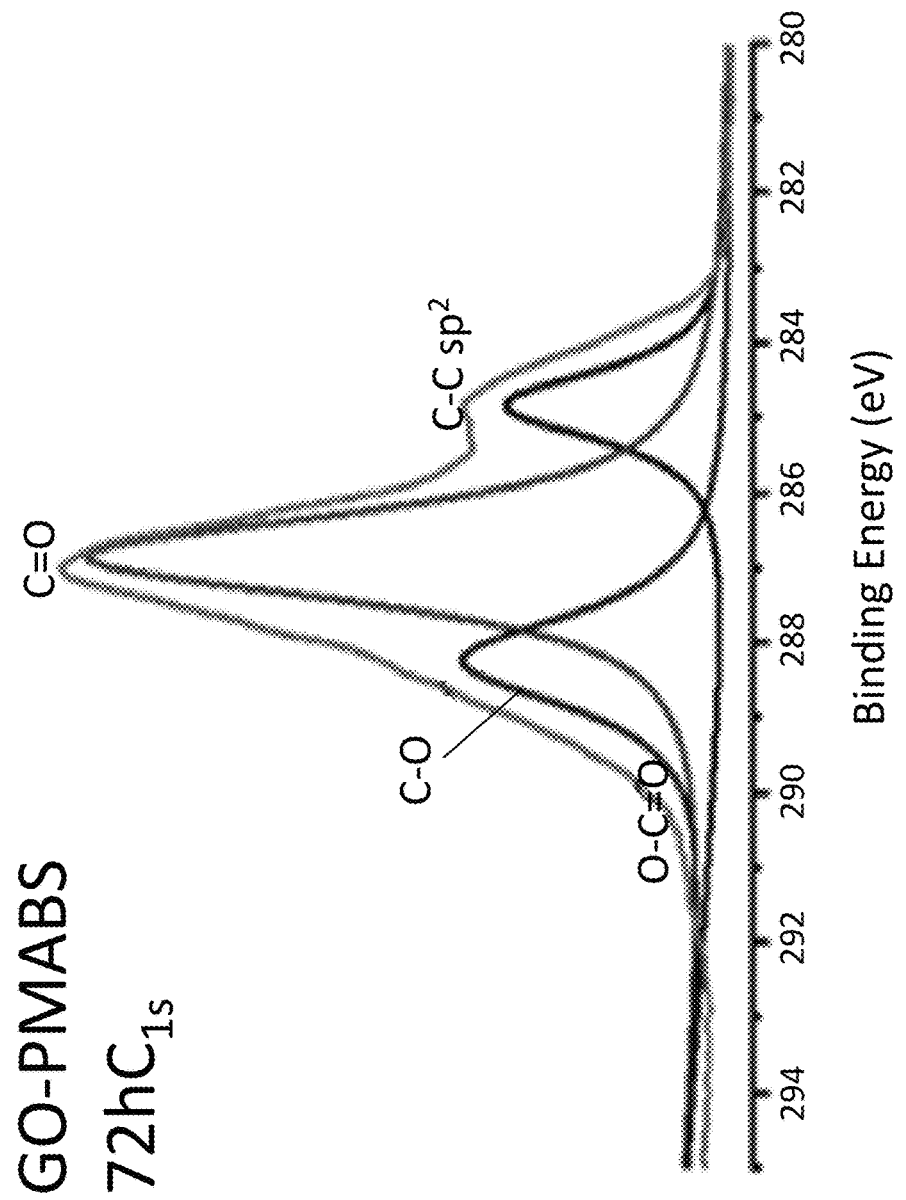
FIG. 1E. XPS $C_{1s}$ peak of GO-PMABS.

FIGS. 1C-E show the XPS $N_{1s}$, $S_{2p}$, and $C_{1s}$ spectra of GO-PMABS. Every one of these peaks exhibited complex structures that indicated the presence of different chemical species. The carbon spectrum could be fitted to a composite of four peaks: one at 286.9 eV indicative of C=O, one at 288.2 eV due to C—O—C, one at 290.5 eV due to carboxyl groups, and the major one at 284.8 eV due to $sp^2$ carbon of graphene oxide. The $S_{2p}$ spectrum could be fitted to a set of three peaks at 167.6, 169.3, and 170.3 eV. They could be attributed to two sets of overlapping doublets, one due to —$SO_3^-$ at 169.3 and 170.3 eV, and the other to the —$SO_3^-$ $NR_4^+$ pair 167.6 and 169.3 eV.[24] The $N_{1s}$ peaks could be fitted to three types of nitrogen that included $NR_4^+$ (403.2 eV), —$SO_3^-NR_4$ (400.6 eV, 400.1 eV), and pyridinic N (398 eV). These spectra were consistent with the chemical structure of GO-PMABS.

The UCST behaviour of the PMABS in water could be observed visually. At 20° C., a 10 wt % PMABS (72 h) mixture in water was cloudy; but at 50° C., it became clear. No similar transition was evident in an organic carbonate solution, in part due to the similar reflective indexes of the polymer and the solvent. For our purpose of a thermally responsive ion membrane, the relevant issue was whether there was any enhanced interaction between the polymer and the electrolyte ions upon heating. Thus, experiments were conducted to monitor changes in the Li salt concentration in the electrolyte upon heating in the presence of GO-PMABS by UV spectroscopy. The UV spectrum of $LiNO_3$ in propylene carbonate (PC) showed an intense absorption peak at ~225 nm by the nitrate ion. The intensity of this peak, collected with the clear portion of the solution, decreased after adding GO-PMABS into the solution, and decreased further when the mixture was heated to 60° C. Thus, nitrate ions, and by inference Li ions as well, adsorb onto GO-PMABS readily and the amount adsorbed was higher at a higher temperature.

The charge storage capacity in a Li metal-graphene electrochemical assembly (see SI) was used as an indication of the ion permeability of the GO-PMABS membrane. Li metal was used as one electrode and a reduced graphene oxide paper as the other. The charge storage capacities of three cells were measured. In one cell, a layer of glass fiber served as the separator, in another one the separator was a layer of GO-PMABS sandwiched between two sheets of glass fiber, and in the third cell it was a layer of glass fiber impregnated with about 70 wt. % of PMABS (GF-P) sandwiched between two layers of glass fiber. Because the PMABS was introduced simply by impregnation, the polymer was not covalently bound to the glass fiber in GF-P, unlike the GO-PMABS.

The charge capacity of the reduced graphene oxide was ~170 mAh $g^{-1}$ during the break-in cycles at room temperature, and increased to ~220 mAh $g^{-1}$ afterwards when the separator was a layer of glass fiber at room temperature. The capacitor increased to ~300 mAh $g^{-1}$ when the temperature was raised to 80° C. (FIG. 2A and FIG. 2B). This increase was repeatable over many cycles, and was likely due to reduced viscosity of the electrolyte solvent at higher temperatures, facilitating ion mobility, and thus higher flux of ions over the same voltage window. In contrast, when the separator was GO-PMABS sandwiched between two layers of glass fiber, the capacity was ~200 mAh $g^{-1}$ at room temperature, but decreased to ~100 mAh $g^{-1}$ at 80° C. (FIG. 2C and FIG. 2D). Again, this change in capacity with temperature was repeatable over many cycles. The opposite temperature behaviour indicated that the ion permeability of GO-PMABS was reduced at elevated temperatures, which resulted in a reduced ion flux and storage capacity when scanned over the same voltage window.

Figure 2E:
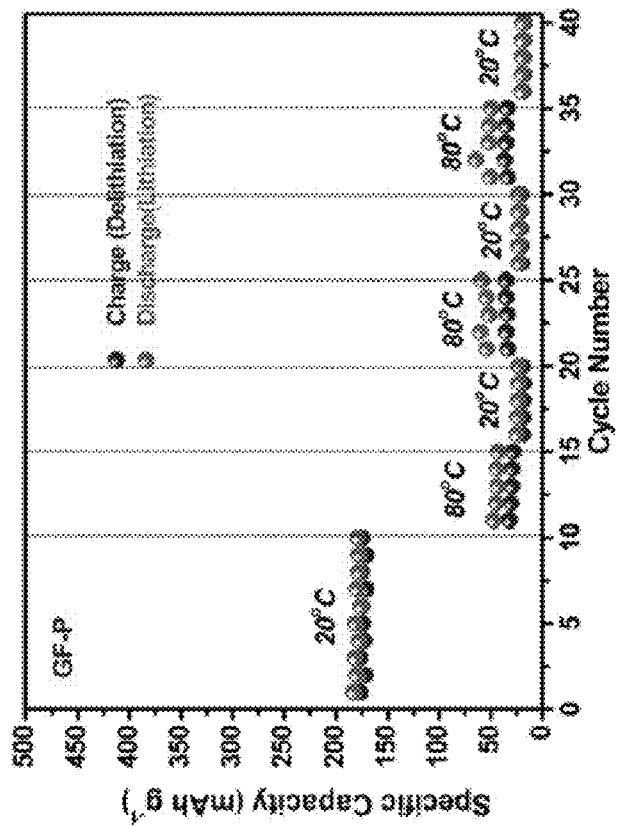

Interestingly, when the separator was GF-P sandwiched between glass fiber layers, the capacity decreased to ~40 mAh $g^{-1}$ at 80° C. from ~170 mAh $g^{-1}$ at room temperature (FIG. 2E and FIG. 2F). But the capacity could not be restored when the temperature was lowered back to room temperature. In fact, the cell assembly appeared to have loss its charge storage capacitor irreversibly after one heating cycle. We interpreted this as due to segregation of the polymer PMABS. Since PMABS was only physically deposited on the glass fiber, after heating and dissolution in the solvent when the temperature was raised, subsequent cooling caused the polymer to segregate out from the solvent and deposit onto the electrodes. This blocked the electrode and thus destroyed the charge capacity.

The cell impedance with or without GO-PMABS were collected at OCV, and the data are shown in FIG. 3. At room temperature, the Nyquist plots were similar with (curve c) or without (curve a) the GO-PMABS, showing semicircles of about the same diameter, which indicated roughly equal charge transfer/polarization resistance ($R_{ct}$, 118Ω without and 97Ω with GO-PMABS). This suggested that the properties of the electrolyte and electrodes were not affected by the presence of GO-PMABS. The charge transfer/polarization resistance was lowered to ~12Ω for the sample without GO-PMABS, and to ~34Ω with GO-PMABS. This decrease in resistance was consistent with the lower viscosity of the electrolyte and the corresponding increase in ionic conductivity at higher temperatures.[25, 26] There was not much difference between 60 and 80° C.

The cyclic voltammetry curves of the reduced graphene oxide electrode were similar whether the separator contained GO-PMABS or not. Thus, there was no detectable electrochemical reaction associated with the presence of GO-PMABS.

CONCLUSION

We have shown that a membrane that is modified with a UCST polymer can function to restrict ion flow reversibly at elevated temperatures. This was demonstrated using a PMABS-modified graphene oxide, and applied to an assembly that resembles a Li ion battery. Since the upper critical temperature depends on the nature of the polymer and the solvent, such as molecular weight and density and nature of the zwitterions, there are many avenues available to tune the transition temperature and magnitude of change of ionic permeability. For example, the transition temperature would be higher for a larger molecular weight polymer with a higher density of zwitterions.

SUPPLEMENTARY INFORMATION

Materials and Methods
Graphene Oxide (GO)

GO was synthesized from flake graphite (Asbury Carbons, 230U Grade, High Carbon Natural Graphite 99+) by a modified Hummers method. The graphite powder (2.0 g) was preoxidized by stirring it into a concentrated $H_2SO_4$ (20 mL) solution in which $K_2S_2O_8$ (1.0 g) and $P_2O_5$ (1.0 g) were completely dissolved at 80° C. The mixture, in a beaker, was kept at 80° C. for 4.5 h using an oil bath. After the mixture was cooled and diluted with 1 L of DDI (distilled deionized) water, the pretreated product was filtered with a Nylon membrane filter (47 mm diameter, 0.2 μm pore size, Milipore) and washed on the filter until the pH of filtrate water became neutral. The shiny, dark-gray, preoxidized graphite was dried in air overnight. Then it was dispersed by stirring into chilled $H_2SO_4$ (75 mL) in an Erlenmeyer flask in an ice bath. $KMnO_4$ (10 g) was added slowly with stirring to keep the temperature of reaction mixture below 20° C. The resulting thick, dark green paste was allowed to react at 35° C. for 2 h followed by addition of DDI water (160 mL) to form a dark brown solution. To avoid over-flow of the mixture due to rapid temperature rise with foaming by water addition, the flask was chilled in an ice bath and water was added in ~5 mL aliquots with close monitoring of temperature (kept below 50° C.). After additional stirring for 2 h, the dark brownish solution was further diluted with distilled water (500 mL), and $H_2O_2$ (30%, 8.3 mL) was added slowly. The color of the mixture turned bright yellow. The mixture was allowed to settle overnight. The supernatant was decanted and the remaining product was repeatedly centrifuged and washed with DDI water until the pH of the solution became neutral. (At this stage, the Mn concentration in the supernatant was below 0.1 ppm by AAS). Then, the obtained product was diluted to make a ~0.5% w/w aqueous dispersion for storage.

4-hydroxyethylphenyl Functionalized Graphene Oxide (GO-OH)

GO (0.50 g, 5 mmol) was homogeneously suspended in 250 mL DDI water. 4-aminophenethyl alcohol (6.3 g, 50 mmol), isopentyl nitrite (75 mL, 0.5 mol) were added into the GO suspension. The reactor with condenser was filled with nitrogen, heated at 60° C., and refluxed for 3 h. The reaction mixture was filtered over a Nylon membrane (47 mm diameter, 0.2 μm pore size), washed with acetone (250 mL), DMF (250 mL), water (250 mL), and acetone (250 mL). This process was repeated several times until the impurities were completely removed. Finally, the mixture was washed with diethyl ether (250 mL) and dried overnight in a vacuum oven at 60° C.

2-bromo-2-methylpropanoate-4-methylphenethyl Functionalized Graphene Oxide (GO-Br)

GO-OH (220 mg, 2.2 mmol) was dispersed in a mixture of dry THF (50 mL) and DMF (150 mL) by sonication for 1 hour. Triethylamine (61.31 mL, 440 mmol) was added in the reaction, followed by the dropwise addition of α-bromoisobutyryl bromide (5.5 mL, 44 mmol) in ice bath for 1 h. The mixture was allowed to stir for 48 h at room temperature. The reaction mixture was filtered over a Nylon membrane (47 mm diameter, 0.2 μm pore size), washed with acetone (250 mL), THF (250 mL), DMF (250 mL), and DDI water (250 mL). This process was repeated several times until the impurities were completely removed. Finally, the product was washed with diethyl ether (250 mL) and dried overnight in a vacuum oven at 60° C.

An elemental analysis determined the elemental weight fraction of C, H, N, O of GO-Br to be 64.48%, 3.63%, 2.70%, and 12.97%, respectively. The content of Br is estimated to be 16.22% based on 100%.

GO-PMADS 72 h

GO-Br (0.10 g) and 3-(N-2-methacryloyloxyethyl-N,N-dimethyl)ammonatobutanesulfonate (15 g, 53.5 mmol) were mixed in 40 mL DDI water and 160 mL MeOH at room temperature and deoxygenated by passing a continuous stream of dry argon through the solution while stirring for 30 min. 2,2'-dipyridyl (420 mg, 2.7 mmol), CuCl (106 mg, 1.08 mmol), and $CuCl_2$ (15 mg, 0.10 mmol) were added to this solution under the protection of argon flow. The mixture was then stirred while deoxygenating with a stream of dry argon for another 30 min. The polymerization started as soon as the catalysts were in.

The polymerization was finally stopped at 72 h by exposing the mixture to air. GO-PMADS 72 h was filtered over a Nylon membrane (47 mm diameter, 0.2 μm pore size), washed by hot water several times to remove free polymers which could be physically adhered to the surface of GO-PMADS 72 h. The resulting GO-PMADS 72 h was dried under vacuum at 60° C. for 24 h.

The molecular weight (Mn) and molecular weight distribution (Mw/Mn) of the PMABS were obtained using the free polymers formed from the sacrificial initiator, ethyl 2-bromoisobutyrate (EBiB), under the same reaction conditions. It is generally believed that the free polymer initiated by the sacrificial initiator in solution has almost identical molecular weights to those formed from the solid support. Two polymerization times, 36 hours and 72 hours, were used for comparison. A multi-angle light scattering coupled to size-exclusion chromatography (Sec-Mals) with polystyrene (PS) standards were used in the determination. The sample with 72 hours polymerization time has higher molecular weight (230,000 g/mol) than the one with 36 hours does (153,000 g/mol), as expected. The two samples both had relatively broad MWD (Mw/Mn=1.62 for the PMAPS-36 h, and 1.48 for the PMAPS-72 h), consistent with the previous studies of the polymerization process in methanol/water solution.

PMADS 72 h on Glass Fiber Membrane

The composite membranes were prepared by casting the 10 wt % PMABS 72 h water solution on the glass fiber membrane at about 40° C. and dried under vacuum at 100° C. for 24 h.

Characterizations

The morphology of as-prepared samples was investigated using Hitachi S-4800-II field emission scanning electron microscopy (FE-SEM), JOEL 2100F field emission transmission electron microscopy (FE-TEM), and Hitachi HD-2300A FE-STEM operated at 200 kV with energy dispersive spectroscopy (EDS) detectors. X-ray photoelectron spectroscopy (XPS) was performed using an Omicron ESCA Probe equipped with an electron flood gun. The AlK radiation (1486.6 eV) was used as an excitation source and the binding energy scale was calibrated with respect to adventitious carbon (C1s). Thermogravimetric analysis (TGA, Mettler Toledo, TGA/SDTA851e) was performed under nitrogen. The samples were heated to 100° C. and held at 100° C. for 10 min to remove any volatiles and adsorbed water. Then the temperature was ramped to 800° C. at the rate of 10° C. min$^{-1}$ in flowing nitrogen. Elemental analysis was performed by Robertson microlit laboratories.

UV-vis absorbance spectra were collected using a HP (Agilent) 8452 diode array spectrophotometer. The molecular weight was determined using the SEC-MALS-QELS system, which is composed of an Agilent 1260 series HPLC for size exclusion chromatography followed by a Wyatt DAWN HELEOS II multi-angle static light scattering detector, a Wyatt QELS dynamic light scattering detector, and a Wyatt T-rEx differential refractive index detector. The measurement followed the literature procedure.[28] 200 mM NaCl aqueous solution was used as an eluent at a rate of 0.8 mL min$^{-1}$. The specific refractive index increments (dn/dc) of PMABS were determined as 0.12 mL g$^{-1}$. Both of the UV-vis and SEC-MALS measurements were performed in Keck Biophysics Facility, Northwestern University.

Electrochemical Test

Electrochemical measurements were carried out using two-electrode coin cells with Li metal as the counter electrode, in an assembly shown in FIG. 7.

Microporous glass-fiber membrane (Whatman) was used as separator, and an Al foil was employed to connect the composite papers to external leads. The electrolyte consisted of 1 M LiPF$_6$ in ethylene carbonate (EC)/dimethyl carbonate (DMC) (7:3, v/v). The coin cells for EIS measurements used one piece of GO-PMABS 72 h membrane as an additional separator to GF. The galvanostat measurements used two pieces of GO-PMABS 72 h overlaid as an additional separator. The cells were assembled in an argon-filled glove box, and galvanostatic measurements were conducted with a BT2000 Potentiostat/Galvanostat system (Arbin Instruments) at various current densities, typically in the voltage range of 0.02-1.5 V vs. Li/Li$^+$. Cyclic voltammograms (CV) were recorded over the same voltage range at scan rates of 0.01 mVs$^{-1}$. Electrochemical impedance spectroscopy (EIS) measurements were conducted using a Solartron 1260 impedance analyzer coupled with a Solartron 1286 electrochemical interface by applying an AC voltage of 10 mV amplitude and DC open circuit voltage (OCV) in the frequency range of 1 MHz-0.01 Hz at room temperature.

The temperature dependent galvanostat measurements used a constant current of 200 mA/g. An empty beaker was heated to 80° C. in oil bath. The coin cells were put in the heated beaker during the cycle. The cell was in contact with the bottom of the beaker to ensure the desired temperature. The EIS at 60° C. measured in a similar way.

The materials devices and methods described herein may be embodied in many different forms and should not be construed as limited to the embodiments set forth herein. These embodiments are provided in sufficient written detail to describe and enable one of ordinary skill in the art to make and utilize the invention as defined by the claims and equivalents thereof.

Likewise, many modifications and other embodiments of the devices and methods disclosed herein will come to mind to one of skill in the art to which the inventions pertain having benefit of the teachings presented in the foregoing descriptions and associated drawings. Therefore, it is to be understood that the inventions disclosed herein are not to be limited to the specific embodiments disclosed and that modifications and other embodiments are intended to be included within the scope of the appended claims. Although specific terms are disclosed herein, they are used in a generic and descriptive sense only and not for purposes if limitation.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein.

Terms used herein are intended as "open" terms (for example, the term "including" should be interpreted as "including but not limited to," the term "having" should be interpreted as "having at least," the term "includes" should be interpreted as "includes but is not limited to," etc.).

Furthermore, in those instances where a convention analogous to "at least one of A, B and C, etc." is used, in general such a construction is intended in the sense of one having ordinary skill in the art would understand the convention (for example, "a system having at least one of A, B and C" would include but not be limited to systems that have A alone, B alone, C alone, A and B together, A and C together, B and C together, and/or A, B, and C together.). It will be further understood by those within the art that virtually any disjunctive word and/or phrase presenting two or more alternative terms, whether in the description or figures, should be understood to contemplate the possibilities of including one of the terms, either of the terms, or both terms. For example, the phrase "A or B" will be understood to include the possibilities of "A" or 'B or "A and B."

All language such as "from," "to," "up to," "at least," "greater than," "less than," and the like, include the number recited and refer to ranges which can subsequently be broken down into sub-ranges as discussed above.

A range includes each individual member. Thus, for example, a group having 1-3 members refers to groups having 1, 2, or 3 members. Similarly, a group having 6 members refers to groups having 1, 2, 3, 4, or 6 members, and so forth.

The modal verb "may" refers to the preferred use or selection of one or more options or choices among the several described embodiments or features contained within the same. Where no options or choices are disclosed regarding a particular embodiment or feature contained in the same, the modal verb "may" refers to an affirmative act regarding how to make or use and aspect of a described embodiment or feature contained in the same, or a definitive decision to use a specific skill regarding a described embodiment or feature contained in the same. In this latter context, the modal verb "may" has the same meaning and connotation as the auxiliary verb "can."

As used herein, the articles "a" and "an" refer to one or to more than one (for example, to at least one) of the grammatical object of the article.

"About" and "approximately" shall generally mean an acceptable degree of error for the quantity measured given the nature or precision of the measurements. Exemplary degrees of error are within 20-25 percent (%), typically, within 10%, and more typically, within 5% of a given value or range of values.

REFERENCES

1. Tokarev, I.; Minko, S., *Adv. Mater.* 2010, 22, (31), 3446-3462.
2. Wandera, D.; Wickramasinghe, S. R.; Husson, S. M., *J. Membr. Sci.* 2010, 357, (1-2), 6-35.
3. Kirsebom, H.; Galaev, I. Y.; Mattiasson, B., *J. Polym. Sci. B: Polym. Phys.* 2011, 49, (3), 173-178.
4. Liang, L.; Shi, M.; Viswanathan, V. V.; Peurrung, L. M.; Young, J. S., *J. Membrane Sci.* 2000, 177, (1-2), 97-108.
5. Ko, H.; Zhang, Z.; Chueh, Y.-L.; Saiz, E.; Javey, A., *Angew. Chem. Int. Ed.* 2010, 49, (3), 616-619.
6. Pei, Y.; Travas-Sejdic, J.; Williams, D. E., *Langmuir* 2012, 28, (21), 8072-8083.
7. Wan, P.; Xing, Y.; Chen, Y.; Chi, L.; Zhang, X., *Chem. Comm.* 2011, 47, (21), 5994-5996.
8. Yavuz, M. S.; Cheng, Y.; Chen, J.; Cobley, C. M.; Zhang, Q.; Rycenga, M.; Xie, J.; Kim, C.; Song, K. H.; Schwartz, A. G.; Wang, L. V.; Xia, Y., *Nat. Mater.* 2009, 8, (12), 935-939.
9. Meng, F.; Zhong, Z., *J. Phys. Chem. Lett.* 2011, 2, (13), 1533-1539.
10. Wong, S.; Shim, M. S.; Kwon, Y. J., *J. Mater. Chem. B: Mater. Biol. Medicine* 2014, 2, (6), 595-615.
11. Dou, Y.; Pan, T.; Zhou, A.; Xu, S.; Liu, X.; Han, J.; Wei, M.; Evans, D. G.; Duan, X., *Chem. Comm.* 2013, 49, (76), 8462-8464.
12. Baginska, M.; Blaiszik, B. J.; Merriman, R. J.; Sottos, N. R.; Moore, J. S.; White, S. R., *Adv. Energy Mater.* 2012, 2, (5), 583-590.
13. Feng, X. M.; Ai, X. P.; Yang, H. X., *Electrochem. Commun.* 2004, 6, (10), 1021-1024.
14. Zhong, H.; Kong, C.; Zhan, H.; Zhan, C.; Zhou, Y., *J. Power Sources* 2012, 216, 273-280.
15. Arora, P.; Zhang, Z., *Chem. Rev.* 2004, 104, (10), 4419-4462.
16. Georgiev, G. S.; Mincheva, Z. P.; Georgieva, V. T., *Macromolecular Symposia* 2001, 164, (1), 301-312.
17. Knoesel, R.; Ehrmann, M.; Galin, J. C., *Polymer* 1993, 34, (9), 1925-1932.
18. Weers, J. G.; Rathman, J. F.; Axe, F. U.; Crichlow, C. A.; Foland, L. D.; Scheuing, D. R.; Wiersema, R. J.; Zielske, A. G., *Langmuir* 1991, 7, (5), 854-867.
19. Zhao, X.; Hayner, C. M.; Kung, M. C.; Kung, H. H., *ACS Nano* 2011, 5, (11), 8739-8749.
20. Barbey, R.; Lavanant, L.; Paripovic, D.; Schüwer, N.; Sugnaux, C.; Tugulu, S.; Klok, H.-A., *Chem. Rev.* 2009, 109, (11), 5437-5527.
21. Bak, J. M.; Lee, T.; Seo, E.; Lee, Y.; Jeong, H. M.; Kim, B.-S.; Lee, H.-i., *Polymer* 2012, 53, (2), 316-323.
22. Iruthayaraj, J.; Chernyy, S.; Lillethorup, M.; Ceccato, M.; Røn, T.; Hinge, M.; Kingshott, P.; Besenbacher, F.; Pedersen, S. U.; Daasbjerg, K., *Langmuir* 2011, 27, (3), 1070-1078.
23. Azzaroni, O.; Brown, A. A.; Huck, W. T. S., *Angew. Chem. Int. Ed.* 2006, 45, (11), 1770-1774.
24. Zotti, G.; Zecchin, S.; Schiavon, G.; Louwet, F.; Groenendaal, L.; Crispin, X.; Osikowicz, W.; Salaneck, W.; Fahlman, M., *Macromolec.* 2003, 36, (9), 3337-3344.
25. Brouillette, D.; Perron, G.; Desnoyers, J. E., *Electrochim. Acta* 1999, 44, 4721-4742.
26. Southall, J. P.; Hubbard, H. V. S. A.; Johnston, S. F.; Rogers, V.; Davies, G. R.; McIntyre, J. E.; Ward, I. M., *Solid State Ionics* 1996, 85, 51-60.
27. Rubinson, J. F.; Kayinamura, Y. P., *Chem. Soc. Rev.* 2009, 38, 3339-3347.
28. Y. Terayama, M. Kikuchi, M. Kobayashi, A. Takahara, Well-Defined Poly(sulfobetaine) Brushes Prepared by Surface-Initiated ATRP Using a Fluoroalcohol and Ionic Liquids as the Solvents, Macromolecules, 44 (2010) 104-111.

What is claimed is:
1. A thermally responsive material comprising:
a substrate; and
poly(3-(N-2-methacryloyloxyethyl-N,N-dimethyl)ammonatobutane-sulfonate molecules covalently bonded to the substrate, the polymer molecules having an upper-critical solution temperature in a non-aqueous solution, the polymer molecules characterized in that they phase separate from the non-aqueous solution at temperatures below the upper-critical solution temperature, but undergo a reversible conformational change at the upper-critical solution temperature such that they are miscible in the non-aqueous solution at temperatures above the upper-critical solution temperature;
wherein the thermally responsive material is porous and electrically insulating.
2. The material of claim 1, wherein the poly(3-(N-2-methacryloyloxyethyl-N,N-dimethyl)ammonatobutane-sulfonate molecules have an Mn in the range from about 100,000 to about 400,000 g/mol.
3. A battery comprising:
a first electrode;
a second electrode;
a porous, electrically insulating, thermally responsive membrane between the first electrode and the second electrode, the porous, electrically insulating, thermally responsive membrane comprising: a substrate and polymer molecules covalently bonded to the substrate, the polymer molecules having an upper-critical solution temperature in non-aqueous solution, such that they phase separate from the non-aqueous solution at temperatures below the upper-critical solution temperature, but undergo a reversible conformational change at the upper-critical solution temperature such that they are miscible in the non-aqueous solution at temperatures above the upper-critical solution temperature, wherein the porous, electrically insulating, thermally responsive membrane allows for ion transport from the first electrode to the second electrode, at least when the battery is operating at a temperature below the upper-critical solution temperature; and
a non-aqueous electrolyte in the pores of the porous membrane;

wherein the ionic permeability of the porous, electrically insulating, thermally responsive membrane decreases at temperatures above the upper-critical solution temperature.

4. The battery of claim 3, wherein the polymer molecules are polybetaine molecules.

5. The battery of claim 4, wherein the polymer molecules are poly(sulfobetaine) polymer molecules.

6. The battery of claim 5, wherein the polymer molecules are poly(3-(N-2-methacryloyloxyethyl-N,N-dimethyl)ammonatobutane-sulfonate molecules.

7. The battery of claim 6, wherein the poly(3-(N-2-methacryloyloxyethyl-N,N-dimethyl)ammonatobutane-sulfonate molecules have an Mn in the range from about 100,000 to about 400,000 g/mol.

8. The battery of claim 3, wherein the substrate comprises graphene oxide sheets.

9. The battery of claim 3, wherein the first electrode comprises lithium metal and the non-aqueous electrolyte comprises a lithium salt and an organic solvent.

10. The battery of claim 8, wherein the first electrode comprises lithium metal and the non-aqueous electrolyte comprises a lithium salt and an organic solvent.

11. The battery of claim 10, wherein the polymer molecules are polybetaine molecules.

12. The battery of claim 3, wherein the second electrode comprises graphene sheets.

13. The battery of claim 8, wherein the second electrode comprises graphene sheets.

14. The battery of claim 4, wherein the substrate comprises graphene sheets.

15. A thermally responsive material comprising:
an ion permeable, porous, electrically insulating membrane comprising:
a porous substrate; and
polymer molecules covalently bonded to the substrate, the polymer molecules having an upper-critical solution temperature in a non-aqueous solution, the polymer molecules characterized in that they phase separate from the non-aqueous solution at temperatures below the upper-critical solution temperature, but undergo a reversible conformational change at the upper-critical solution temperature such that they are miscible in the non-aqueous solution at temperatures above the upper-critical solution temperature, wherein the polymer molecules are poly(3-(N-2-methacryloyloxyethyl-N,N-dimethyl)ammonatobutane-sulfonate molecules; and
the non-aqueous solution comprising ions in pores of the ion permeable, porous, electrically insulating membrane.

16. The material of claim 15, wherein the poly(3-(N-2-methacryloyloxyethyl-N,N-dimethyl)ammonatobutane-sulfonate molecules have an Mn in the range from about 100,000 to about 400,000 g/mol.

* * * * *